Dec. 28, 1926.
W. K. BROWN
1,612,566
MOLD
Filed March 19, 1925
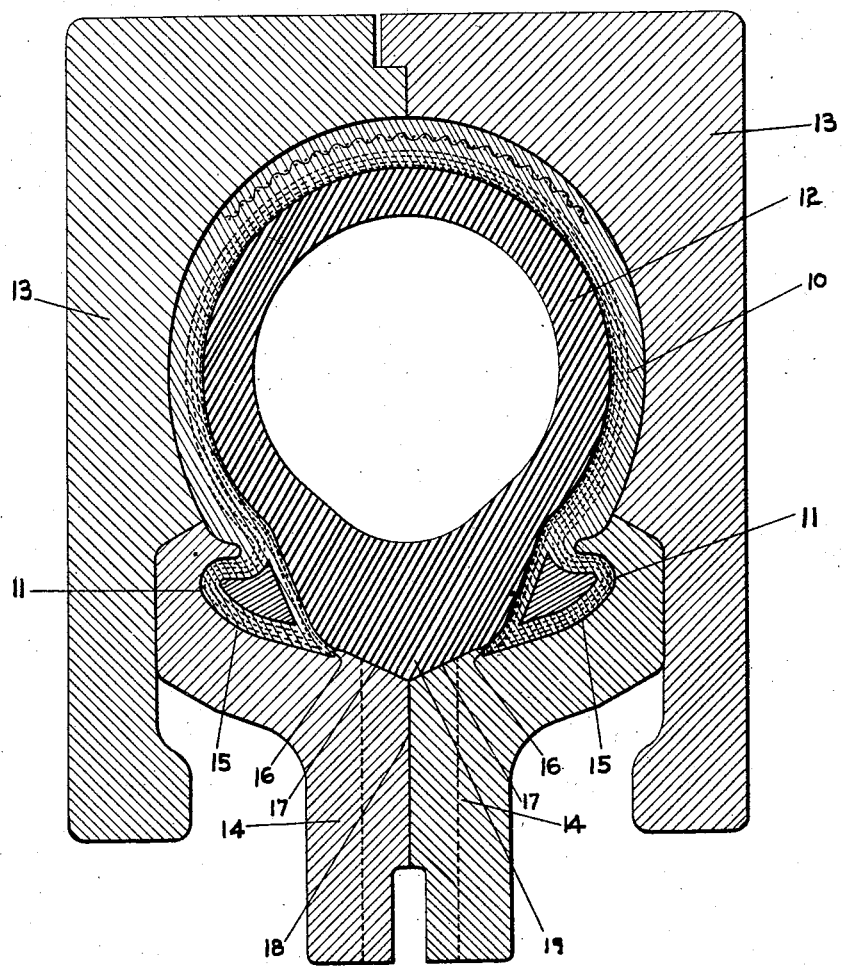
INVENTOR.
WILLIAM K. BROWN.
BY
ATTORNEY.

Patented Dec. 28, 1926.

1,612,566

UNITED STATES PATENT OFFICE.

WILLIAM K. BROWN, OF AKRON, OHIO, ASSIGNOR TO THE FIRESTONE TIRE AND RUBBER COMPANY, OF AKRON, OHIO, A CORPORATION OF OHIO.

MOLD.

Application filed March 19, 1925. Serial No. 16,708.

This invention relates to molds for use in vulcanizing tire.

In the manufacture of tire casings, the beads of the tire are usually formed of fabric and rubber. In the past, the bead molding rings employed about the beads during vulcanization by the internal pressure method with the use of pressure bags have been such that flow of the rubber under pressure of the bag has left practically bare rough fabric about the "toe" of the bead which tends to abrade the inner tube when in use and to cause blow-outs thereof.

The objects of the invention are to provide a mold to produce a tire having well-defined tips of rubber on the toes of the beads and including simple inexpensive bead forming rings to be used in conjunction with an air or other pressure bag to form a well-defined protective tip of rubber on the "toe" of the bead, thus overcoming the above-described objection.

The above and other objects will become apparent when the following description is read in connection with the accompanying drawing illustrating an embodiment of the invention.

In the single figure of the drawing, there is illustrated a cross-section of a mold having a tire and air bag therein and including bead rings constructed according to the invention.

Referring to the drawing, 10 represents a tire, here shown as of the clincher type, having beads 11, 11. An air bag 12 is shown within the tire and the usual mating mold halves 13, 13 are shown surrounding the tire. Clamped between the mold halves 13 in the customary manner are bead forming rings 14, 14 which are formed with bead molding surfaces 15, 15. The surfaces 15 are defined in part by shoulders 16, 16 formed on the rings which shoulders mold to shape the toes of the beads. From the shoulders 16 the surfaces 17, 17 of the rings 14 incline to their meeting faces at 18. The inner periphery of the bag 12 is formed with a wedge-shaped tongue 19 adapting the bag 12 to be properly seated on said rings.

During vulcanization, expanding of the bag, effected in the usual manner, will urge the beads into intimate contact with the surfaces 15 but shoulders 16 will prevent the bag from pressing the rubber away from the tips of the toes to expose the bare rough fabric. Pressure of the bag on the beads above shoulder 16 will cause the rubber of the beads to flow into contact with shoulders 16 and will thus form a blunt well-defined flexible rubber tip on the toe of each bead which will have no tendency to chafe the inner tube during subsequent use of the tire.

Modifications of the invention may be resorted to without departing from the spirit thereof or the scope of the appended claims.

What is claimed is:

1. The combination with a tire mold of an air bag for use within a tire in said mold and a pair of bead molding rings on which said bag seats, said rings being formed with shoulders defining the toes of the tire beads.

2. The combination with a tire mold of an air bag for use within a tire in said mold and a pair of bead molding rings on which said bag seats, said rings being formed with shoulders defining the toes of the tire beads, the shoulders being of such height as to effect the formation of a well-defined blunt tip of rubber caused to flow into contact with said shoulders by the action of said air bag.

3. The combination with a tire mold of an air bag for use in the mold, said mold including a bead molding portion provided with a shoulder for molding a well-defined toe on the bead, said bag overlying the shoulder.

WILLIAM K. BROWN.